United States Patent Office 3,812,171
Patented May 21, 1974

3,812,171
PRODUCTION OF NITRILES BY AMMOXIDATION
William C. Neikam, West Chester, and Robert L. James, Springfield, Pa., assignors to Sun Research and Development Co., Marcus Hook, Pa.
No Drawing. Filed June 29, 1972, Ser. No. 267,303
Int. Cl. C07c 121/02
U.S. Cl. 260—465 C    8 Claims

ABSTRACT OF THE DISCLOSURE

In the process of carrying out ammoxidation reactions using $V_2O_5$ as catalyst, the improvement which comprises employing said $V_2O_5$ in the form of a molten eutectic mixture with $K_2O$.

---

It is known in the art that aromatic hydrocarbons such as o-xylene may be oxidized to o-tolualdehyde and other oxidation products by passing the hydrocarbon and oxygen (air) through a melt of vanadium pentoxide and potassium sulfate at 520°–598° C. (Satterfield and Loftus, A. I. Ch. E. Journal 11 p. 1103, 1965). Similarly, it is disclosed in U.S. 3,012,043 that potassium vanadyl vanadate made by heating 76.3 mole percent of $V_2O_5$ and 23.6 mole percent of $K_2CO_3$ is useful as particulates or on a support as an oxidation catalyst for aromatic hydrocarbons.

The vapor phase ammoxidation of organic compounds to nitriles is well known and is exemplified by U.S. 2,463,457 (Denton, assigned to Socony-Vacuum Oil Co., issued Mar. 1, 1949) and by U.S. 2,496,661 (Denton, assigned to Socony-Vacuum Oil Co., issued Feb. 7, 1950). Such processes are particularly useful for preparing nitriles of aromatic hydrocarbons, as for example, conversion of toluene to benzonitrile, xylenes to toluonitriles and phthalonitriles and the like, and they are also of value generally for converting alkyl-substituted aliphatic, aromatic, alicyclic, and heterocyclic compounds to the corresponding nitriles.

It has now been found that ammoxidation reactions, such as those referred to in the above patents, may be carried out with a catalyst of a molten eutectic mixture of $V_2O_5$ and $K_2O$ which consists essentially of 39 mole percent of $K_2O$ and 61 mole percent of $V_2O_5$. This mixture is readily prepared simply by mixing 39 mole percent of $K_2CO_3$ with 61 mole percent of $V_2O_5$ and heating the mixture slowly and with stirring to about 500° C. During the heating steps, $CO_2$ is evolved and the resulting eutectic mixture melts at 390° C. This eutectic composition is described in the article by Holtzberg, J.A.C.S., 78, p. 1538, 1956.

In carrying out the process of the invention vapors of hydrocarbon and ammonia are passed through the molten eutectic which is contained in a reactor and held at a temperature of from about 400° to about 500° C., the usual ammoxidation temperature range. Reaction pressure is preferably atmospheric pressure, although higher and lower pressures may be used (e.g., from about 0.5 to about 20 atmospheres). The products of the reaction, together with any unconverted reactants, are removed from the reactor and separated by conventional methods, any unreacted hydrocarbon being recycled to the reactor, if desired. Similarly, recycle of partially ammoxidized hydrocarbons( e.g., p-xylene converted to p-toluonitrile) may be recycled for further conversion to polynitriles. The ratio of ammonia to xylene to hydrocarbon, while not a critical parameter, should be at least about 3 moles of ammonia per mole of hydrocarbon group to be converted to nitrile. In general, an ammonia to hydrocarbon ratio of from about 3:1 to about 12:1 will be employed and such ratios are consistent with the prior art ammoxidation processes. It will be understood that the usual reaction conditions and techniques of prior art ammoxidation processes may be used with the process of this invention.

The organic reactants useful in the process may be selected from a wide variety of compounds and will include alkyl-substituted aromatic, aliphatic, alicyclic, and heterocyclic compounds. Among preferred starting materials are the mono- and polyalkyl-substituted aromatic hydrocarbons such as toluene, the xylenes, $\alpha$-methylnaphthalene, polymethylnaphthalenes, mono-alkyl and polyalkyl anthracenes, mesitylene durene, and the like. The alkyl substituent may, of course, contain more than a single atom and thus the corresponding ethyl and other lower alkyl substituents are also useful.

Aliphatic compounds normally subjected to ammoxidation include the olefinic compounds. Thus, any olefinic hydrocarbon having at least one alkyl group is useful in the process. Examples of such compounds are propylene, butenes, octenes, methyl heptenes, alkyl-butadienes, pentadienes, ethyl butenes, hexadienes, heptadienes, and the like, all of which will give the corresponding nitriles. Preferred olefins are those containing up to about ten carbon atoms, particularly propylene, butenes, and the methyl-butadienes and cycloolefinic compounds, particularly the alkyl-substituted hydrocarbon olefins exemplified by 3-methyl cyclohexene, 3,6-dimethyl cyclohexene, methyl Tetralin and the like.

Also of value as reactants are alicyclic compounds having an alkyl substituent and these compounds are exemplified by methylcyclopentane, methylcyclohexane, the alkyl-substituted decalins, and the like.

The heterocyclic compounds useful as organic reactants in the process will include alkyl-substituted furans, pyrroles, indoles, thiophenes, pyrazoles, imidazoles, thiazoles, oxazoles, pyrans, pyridines, quinolines, isoquinolines, pyrimidines, pyridazines, pyrazines, and the like, all of which are converted to the corresponding nitriles. Preferred reactants in this group are the mono-, di and tri-alkyl pyridines.

In order to more fully describe and illustrate the invention the following examples are given:

EXAMPLE 1

A mixture of 39 mole percent of $K_2CO_3$ and 61 mole percent of $V_2O_5$ is heated slowly with stirring to 500° C. Carbon dioxide is evolved and the remaining material has a melting point of 390° C. The X-ray diffraction pattern of the eutectic matches that of $K_3V_5O_{14}$ which is consistent with the 39 $K_2O$/61 $V_2O_5$ mixture.

EXAMPLES 2 TO 4

The eutectic mixture of Example 1 is placed in a pyrex reactor fitted with inlet and outlet tubes for reactants and products. Ammonia and hydrocarbon mixtures are bubbled through the molten eutectic at 440° C. for 60 minutes at a hydrocarbon flow rate of $8 \times 10^{-4}$ moles per minute. The following table gives additional specific reaction data and indicates the results obtained:

TABLE I
The ammoxidation of m-xylene in $V_2O_5$ eutectic

| Example | Effective salt volume, cc. | Ammonia/ xylene (molar) | Carbon balance as m-xylene recovered, percent | m-Xylene, conversion, percent |
|---|---|---|---|---|
| 2 | 76.2 | 2.87 | 88.3 | 15.23 |
| 3 | 147.0 | 9.28 | 98.4 | 9.12 |
| 4 | 147.0 | 3.00 | 100.0 | 3.25 |

TABLE I—Continued

Product distribution (mole percent)

| Example | CO₂ | Benzene | Toluene | Other | BN[1] | TN[2] | IPN[3] |
|---|---|---|---|---|---|---|---|
| 2 |  | 3.95 | 6.15 | 18.34 | 9.49 | 58.05 | 4.02 |
| 3 | 0.71 |  | 2.73 | 2.51 | 3.25 | 84.28 | 6.53 |
| 4 | 5.90 | 3.32 | 5.64 | 8.64 | 3.15 | 69.81 | 3.54 |

[1] BN = Benzonitrile. [2] TN = Toluonitrile. [3] IPN = Isophthalonitrile.

A particular advantage of the process which is clear from the above data is that only a small amount of carbon oxides are formed. This is particularly true at the higher ammonia to hydrocarbon mole ratios (Example 3).

EXAMPLE 5

When p-xylene is ammoxidized in the manner of Example 3 (ammonia to hydrocarbon ratio of 10:1) a mixture of benzonitrile, p-toluonitrile, and terephthalonitrile is obtained.

EXAMPLE 6

When 2,6-dimethylnaphthalene is used in Example 3 instead of m-xylene, the reaction products consist essentially of 2-cyanonaphthalene, 2-methyl-6-cyanonaphthalene and 2,6-dicyanonaphthalene.

The invention claimed is:

1. In the process of carrying out ammoxidation reactions to obtain nitriles using $V_2O_5$ as catalyst, the improvement which comprises employing said $V_2O_5$ in the form of a molten eutectic mixture with $K_2O$.

2. In the process of carrying out ammoxidation reactions to obtain nitriles where one mole of an alkyl-substituted compound selected from the group of alkyl-substituted aromatic, alkyl-substituted aliphatic, alkyl-substituted alicyclic, and alkyl-substituted heterocyclic compounds and from about three to twelve moles of ammonia are reacted at a temperature of from about 400° C. to about 500° C. in the presence of a catalyst of $V_2O_5$, the improvements which comprises employing said $V_2O_5$ in the form of a molten eutectic mixture consisting essentially of 39 mole percent or $K_2O$ and 61 mole percent of $V_2O_5$.

3. The process of claim 2 where the ammoxidation is carried out with an aromatic hydrocarbon.

4. The process of claim 3 where the aromatic hydrocarbon is a xylene.

5. The process of claim 3 where the aromatic hydrocarbon is m-xylene.

6. The process of claim 3 where the aromatic hydrocarbon is p-xylene.

7. The process of claim 2 where the aromatic hydrocarbon is a methyl-naphthalene.

8. The process of claim 7 where the alkyl-naphthalene is 2,6-dimethylnaphthalene.

References Cited

UNITED STATES PATENTS 3,395,159   7/1968   Levine _____ 260—461 X

LEWIS GOTTS, Primary Examiner

D. H. TORRENCE, Assistant Examiner

U.S. Cl. X.R.

252—461; 260—250 A, 250 R, 251 R, 283 CN, 294.9, 302 R, 307 R, 309, 310 R, 319.1, 326.62, 329 R, 345.1, 346.1 R